(12) United States Patent
Pokorny et al.

(10) Patent No.: US 8,728,623 B2
(45) Date of Patent: May 20, 2014

(54) HARDCOATS HAVING LOW SURFACE ENERGY AND LOW LINT ATTRACTION

(75) Inventors: Richard J. Pokorny, Maplewood, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 453 days.

(21) Appl. No.: 12/672,356

(22) PCT Filed: Aug. 19, 2008

(86) PCT No.: PCT/US2008/073536
§ 371 (c)(1),
(2), (4) Date: Feb. 5, 2010

(87) PCT Pub. No.: WO2009/029438
PCT Pub. Date: Mar. 5, 2009

(65) Prior Publication Data
US 2011/0086221 A1    Apr. 14, 2011

Related U.S. Application Data

(60) Provisional application No. 60/969,185, filed on Aug. 31, 2007.

(51) Int. Cl.
*B32B 9/00* (2006.01)
*C09D 133/06* (2006.01)
*C09D 133/16* (2006.01)
*C09D 143/04* (2006.01)

(52) U.S. Cl.
USPC .................. 428/411.1; 428/423.1; 526/242; 526/248; 526/301; 526/72; 526/279; 524/560; 524/567; 524/588

(58) Field of Classification Search
USPC ............ 526/242, 248, 301, 72, 279; 524/560, 524/567, 588; 428/411.1, 423.1
See application file for complete search history.

(56) References Cited

U.S. PATENT DOCUMENTS

| | | | |
|---|---|---|---|
| 3,250,808 A | 5/1966 | Moore, Jr. et al. | |
| 3,734,962 A | 5/1973 | Niederprum et al. | |
| 4,085,137 A | 4/1978 | Mitsch et al. | |
| 4,262,072 A | 4/1981 | Wendling et al. | |
| 4,321,404 A | 3/1982 | Williams et al. | |
| 4,472,480 A | 9/1984 | Olson | |
| 4,614,667 A | 9/1986 | Larson et al. | |
| 4,654,233 A | 3/1987 | Grant et al. | |
| 4,825,249 A | 4/1989 | Oki et al. | |
| 4,855,184 A | 8/1989 | Klun et al. | |
| 4,968,116 A | 11/1990 | Hulme-Lowe et al. | |
| 5,002,978 A | 3/1991 | Goldenberg | |
| 5,148,511 A | 9/1992 | Savu et al. | |
| 5,239,026 A | 8/1993 | Babirad et al. | |
| 5,609,990 A | 3/1997 | Ha et al. | |
| 5,677,050 A | 10/1997 | Bilkadi et al. | |
| 5,822,489 A | 10/1998 | Hale | |
| 5,846,650 A | 12/1998 | Ko et al. | |
| 5,948,478 A | 9/1999 | Lenti et al. | |
| 5,962,611 A | 10/1999 | Meijs et al. | |
| 6,127,498 A | 10/2000 | Tonelli et al. | |
| 6,210,858 B1 | 4/2001 | Yasuda et al. | |
| 6,224,949 B1 | 5/2001 | Wright et al. | |
| 6,238,798 B1 | 5/2001 | Kang et al. | |
| 6,299,799 B1 | 10/2001 | Craig et al. | |
| 6,376,572 B1 | 4/2002 | Turri | |
| 6,596,363 B2 | 7/2003 | Hayashida et al. | |
| 6,660,338 B1 | 12/2003 | Hargreaves | |
| 6,673,887 B2 | 1/2004 | Yamaguchi et al. | |
| 6,800,378 B2 | 10/2004 | Hawa et al. | |
| 6,906,115 B2 | 6/2005 | Hanazawa et al. | |
| 7,119,959 B2 | 10/2006 | Shoshi et al. | |
| 7,241,480 B2 | 7/2007 | Hashimoto | |
| 7,537,828 B2 | 5/2009 | Coggio et al. | |
| 7,575,847 B2 | 8/2009 | Jing et al. | |
| 8,147,966 B2 * | 4/2012 | Klun et al. ................ | 428/423.1 |
| 2002/0001710 A1 | 1/2002 | Kang et al. | |
| 2002/0085284 A1 | 7/2002 | Nakamura et al. | |
| 2002/0111518 A1 | 8/2002 | Wang et al. | |
| 2002/0115820 A1 | 8/2002 | Wang et al. | |
| 2003/0012936 A1 | 1/2003 | Draheim et al. | |
| 2003/0116270 A1 * | 6/2003 | Hawa et al. ................ | 156/307.1 |
| 2003/0151029 A1 | 8/2003 | Hsu et al. | |
| 2004/0077775 A1 | 4/2004 | Audenaert et al. | |
| 2004/0209084 A1 | 10/2004 | Yamaya et al. | |
| 2005/0053790 A1 | 3/2005 | Kato | |
| 2005/0072336 A1 | 4/2005 | Itoh et al. | |
| 2005/0106404 A1 | 5/2005 | Hayashida et al. | |
| 2005/0112319 A1 | 5/2005 | Itoh et al. | |
| 2005/0123741 A1 | 6/2005 | Hayashida et al. | |
| 2005/0136252 A1 | 6/2005 | Chisholm et al. | |
| 2005/0158504 A1 | 7/2005 | Itoh et al. | |
| 2005/0158558 A1 | 7/2005 | Hayashida et al. | |

(Continued)

FOREIGN PATENT DOCUMENTS

| | | |
|---|---|---|
| EP | 0479029 | 4/1992 |
| EP | 0537360 | 4/1993 |

(Continued)

OTHER PUBLICATIONS

TEGO® Rad 2700 Product Data Sheet; Jul. 2007, 1 page.
Fluorolink Polymer Modifiers product data sheet from: Solvay Solexis, Sep. 6, 2004, 5 pages.
International Search Report PCT/US2008/073536 Oct. 28, 2008 4 pgs.
TEGO® Rad 2100, "Radiation-curing substrate wetting and flow additive", Apr. 2012, 1 page.
TEGO® Rad 2250, "Radiation-curing substrate wetting, flow and slip additive", Aug. 2012 1 page.

(Continued)

*Primary Examiner* — Satya Sastri
(74) *Attorney, Agent, or Firm* — Carolyn A. Fischer

(57) ABSTRACT

Articles such as optical displays and protective films, comprising a (e.g. light transmissive) substrate having a surface layer comprising the reaction product of a mixture comprising a hydrocarbon-based hardcoat composition and at least one perfluoropolyether urethane additive. The surface layer exhibits low lint attraction in combination with high contact angles. Hardcoat coating compositions comprising a perfluoropolyether urethane additive and a silicone (meth)acrylate additive are also described.

20 Claims, No Drawings

(56) References Cited

U.S. PATENT DOCUMENTS

| | | | |
|---|---|---|---|
| 2005/0182199 A1 | 8/2005 | Jing et al. | |
| 2005/0228152 A1 | 10/2005 | Starry et al. | |
| 2005/0249940 A1 | 11/2005 | Klun et al. | |
| 2005/0249956 A1 * | 11/2005 | Jing et al. | 428/421 |
| 2005/0288385 A1 | 12/2005 | Kondo et al. | |
| 2006/0057307 A1 | 3/2006 | Matsunaga et al. | |
| 2006/0084756 A1 | 4/2006 | Southwell et al. | |
| 2006/0105155 A1 | 5/2006 | Ikeyama et al. | |
| 2006/0216500 A1 | 9/2006 | Klun et al. | |
| 2007/0014018 A1 * | 1/2007 | Wheatley et al. | 359/580 |
| 2007/0086091 A1 | 4/2007 | Sawanobori et al. | |
| 2007/0286993 A1 | 12/2007 | Radcliffe et al. | |
| 2007/0287093 A1 | 12/2007 | Jing et al. | |
| 2008/0124555 A1 | 5/2008 | Klun et al. | |
| 2010/0055470 A1 | 3/2010 | Klun et al. | |

FOREIGN PATENT DOCUMENTS

| | | |
|---|---|---|
| EP | 0339880 | 12/1993 |
| EP | 0379462 | 2/1995 |
| EP | 0433070 | 1/1996 |
| EP | 0870778 | 10/1998 |
| EP | 0743349 | 3/2003 |
| EP | 1057849 | 8/2003 |
| EP | 1411073 | 4/2004 |
| JP | 05-209030 | 8/1993 |
| JP | 10-110118 | 4/1998 |
| JP | 11-503768 | 3/1999 |
| JP | 11080312 | 3/1999 |
| JP | 11-213444 | 8/1999 |
| JP | 11-293159 | 10/1999 |
| JP | 2002 036457 | 2/2002 |
| JP | 2002-190136 | 7/2002 |
| JP | 2002-194031 | 7/2002 |
| JP | 2002 332313 | 11/2002 |
| JP | 2004-043671 | 2/2004 |
| JP | 2004 083877 | 3/2004 |
| JP | 2004-204096 | 7/2004 |
| JP | 2006-037024 | 2/2006 |
| WO | WO 96/23828 | 8/1996 |
| WO | WO 01/00701 | 1/2001 |
| WO | WO 0130873 | 5/2001 |
| WO | WO 03/002628 | 1/2003 |
| WO | WO 03/072625 | 9/2003 |
| WO | WO 03/099904 | 12/2003 |
| WO | WO 2004/044062 | 5/2004 |
| WO | WO 2005/049687 | 6/2005 |
| WO | WO 2005/063484 | 7/2005 |
| WO | WO 2005/103175 | 11/2005 |
| WO | WO 2005/111157 | 11/2005 |
| WO | WO 2005/113641 | 12/2005 |
| WO | WO 2006/007507 | 1/2006 |
| WO | WO 2006/073920 | 7/2006 |
| WO | WO 2006073920 A2 * | 7/2006 |
| WO | WO 2006/102383 | 9/2006 |
| WO | WO 2008/067262 | 6/2008 |

OTHER PUBLICATIONS

TEGO® Rad 2300, "Radiation-curing substrate wetting, flow and slip additive", Aug. 2012 1 page.

TEGO® Rad 2500, "Slip additive and deaerator", Aug. 2012, 1 page.

* cited by examiner

US 8,728,623 B2

HARDCOATS HAVING LOW SURFACE ENERGY AND LOW LINT ATTRACTION

CROSS REFERENCE TO RELATED APPLICATIONS

This application is a national stage filing under 35 U.S.C. §371 of PCT/US2008/073536, filed Aug. 19, 2008, which claims the benefit of U.S. Provisional Application No. 60/969,185, filed Aug. 31, 2007, the disclosure of which is incorporated by reference in its entirety herein.

BACKGROUND

Hardcoats have been used to protect the face of optical displays. Durable hardcoats typically contain inorganic oxide particles, e.g., silica, of nanometer dimensions dispersed in a binder precursor resin matrix, and sometimes are referred to as "ceramers". For example, U.S. Pat. No. 6,132,861 (Kang et al. '861); U.S. Pat. No. 6,238,798 B1 (Kang et al. '798); U.S. Pat. No. 6,245,833 B1 (Kang et al. '833); U.S. Pat. No. 6,299,799 (Craig et al.) and Published PCT Application No. WO 99/57185 (Huang et al.) describe ceramer compositions containing blends of colloidal inorganic oxide particles, a curable binder precursor and certain fluorochemical compounds.

U.S. Pat. Nos. 6,660,388; 6,660,389; 6,841,190 (Liu et al.) as well as U.S. Pat. No. 7,101,618 describe antisoiling hardcoated films suitable for use as protective films for display devices.

WO 2005/111157 describes (Abstract) a hardcoat coating composition for use as a stain repellent single layer on an optical display. The hardcoat coating composition comprises a mono or multi(methyl)acrylate bearing at least one monovalent hexafluoropolypropylene oxide derivative and a free radically reactive fluoroalkyl-group or fluoroalkylene-group containing acrylate compatibilizer.

WO2006/102383 and WO 03/002628 describe various polymerizable perfluoropolyether urethane additives and their use in hardcoats.

SUMMARY

The Applicant has found that while the inclusion of a perfluoropolyether urethane additive in a hardcoat composition advantageously reduces the surface energy rendering the surface ink repellent and/or easy to clean, the inclusion of such additive can disadvantageously result in an increased attraction to lint.

Presently described are articles, such as optical displays and protective films, comprising a (e.g. light transmissive) substrate having a surface layer comprising the reaction product of a mixture comprising a hydrocarbon-based hardcoat composition and at least one perfluoropolyether urethane additive; wherein the surface layer exhibits low lint attraction in combination with low surface energy.

Also described are hardcoat coating compositions comprising:
i) at least 75 wt-% of a hydrocarbon-based hardcoat composition;
ii) up to 5 wt-% solids of one or more perfluoropolyether urethane additives having a perfluoropolyether moiety and at least one free-radically reactive group; and
iii) up to 20 wt-% of one or more free-radically polymerizable silicone (meth)acrylate additives.

In yet another embodiment, a test method for measuring lint attraction is described.

DETAILED DESCRIPTION

Presently described are various (e.g. optical display and protective film) articles comprising a substrate having a surface layer comprising the reaction product of a mixture comprising: i) a hydrocarbon-based hardcoat composition; and ii) at least one perfluoropolyether urethane additives having a perfluoropolyether moiety and at least one free-radically reactive group.

The perfluoropolyether urethane additive alone or optionally in combination with other fluorinated (e.g. perfluoropolyether) additive contributes low surface energy.

The surface energy can be characterized by various methods such as contact angle and ink repellency. Preferably, the surface layer exhibits a static contact angle with water of at least 80 degrees. More preferably, the contact angle is at least about 90 degrees. Alternatively, or in addition thereto, the advancing contact angle with hexadecane is at least 50 degrees. Low surface energy results in anti-soiling and stain repellent properties as well as rendering the exposed surface easy to clean.

Another indicator of low surface energy relates to the extent to which ink from a pen or marker beads up when applied to the exposed surface. The surface layer and articles exhibit "ink repellency" when ink from pens and markers beads up into discrete droplets and can be easily removed by wiping the exposed surface with tissues or paper towels, such as tissues available from the Kimberly Clark Corporation, Roswell, Ga.under the trade designation "SURPASS FACIAL TISSUE."

A durable hardcoat retains its low surface energy properties such as ink repellency. Durability can be defined in terms of results from a modified oscillating sand test (Method ASTM F 735-94) carried out at 300 rpm for 15 minutes as further described in WO 03/002628. Durable hardcoat exhibit a loss value of no greater than 75% loss (e.g. 65 mm according to the ink repellency test), preferably no greater than 45% loss (40 mm), and more preferably substantially no loss (0 mm).

Attraction to lint has typically been difficult to objectively evaluate. Accordingly, the applicant has developed a new test method for the purpose of reproducibly quantifying lint attraction. As described in further detail in the Cellulose Surface Attraction Test, the method generally involves cleaning the surface of the test specimen (e.g. such as with a static neutralizing gun); applying cellulose fibers to the test specimen surface such that any excess cellulose that is not (e.g. staticly) clung to the test specimen surface is removed; and measuring the haze of the cellulose coated surface.

Various cellulose fibers would be suitable for the Cellulose Surface Attraction Test provided that the fibers are of a consistent quality. One suitable type of cellulose fibers is alpha-cellulose fibers commercially available form Sigma Aldrich (Product number C8002) Such cellulose fibers have a bulk density ranging form about 3 to 4.5 cc/g. At least 50% of the C8002 alpha-cellulose fibers pass through a 100 mesh with at least 35% passing through a 200 mesh. No more than 20% of the C8002 alpha-cellulose fibers are retained with a 35 mesh.

Since humidity affects the retention of lint, it is preferred that the Cellulose Surface Attraction Test is conducted in a (e.g. 50%+/−10 relative humidity) controlled humidity environment.

The surface layers described herein preferably have a haze of less than 20%, more preferably less than 10% and even more preferably less than 5% according to the Cellulose Surface Attraction Test.

The perfluoropolyether urethane polymeric additive described herein can be employed as the sole fluorinated component of a one-layer or two-layer hardcoat composition. For embodiments wherein high durability is desired, the one-layer hardcoat composition typically further comprises (e.g. surface modified) inorganic particles. Alternatively, a hardcoat containing inorganic particles can be provided beneath a perfluoropolyether containing surface layer. The thickness of the one-layer hardcoat surface layer or underlying hardcoat of a two-layer hardcoat is typically at least 0.5 microns, preferably at least 1 micron, and more preferably at least 2 microns. The thickness of the hardcoat layer is generally no greater than 25 microns. Preferably the thickness ranges from 3 microns to 5 microns. For a two-layer construction the cured surface layer typically has a thickness of at least about 10 nm and preferably at least about 25 nm. The surface layer typically has a thickness of less than about 200 nm, 100 nm, or 75 nm.

The hardcoat coating composition comprises at least 50 wt-%, 60 wt-%, 70 wt-%, 80 wt-%, or 90 wt-% of one or more multifunctional free-radically polymerizable monomer(s) and/or oligomer(s) that can be phototcured once the hardcoat composition has been coated. Useful multi-(meth)acrylate monomers and oligomers include:

(a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing compounds such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing compounds such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl compounds such as, for example, urethane acrylates, polyester acrylates, and epoxy acrylates can also be employed Such (meth)acrylate compounds are widely available from vendors such as, for example, Sartomer Company of Exton, Pa.; UCB Chemicals Corporation of Smyrna, Ga.; and Aldrich Chemical Company of Milwaukee, Wis.

In one embodiment, the hardcoat may comprise one or more N,N-disubstituted acrylamide and or N-substituted-N-vinyl-amide monomers as described in Bilkadi et al. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

In some embodiments, the hardcoat coating composition comprises at least 50 wt-%, 60 wt-%, 70 wt-%, 80 wt-%, 90 wt-%, or 95 wt-% of a monomer having at least three (meth)acrylate and preferably at least three acrylate groups.

The polymerizable composition for use a hardcoat surface layer or an underlying hardcoat layer preferably contains surface modified inorganic particles that add mechanical strength and durability to the resultant coating. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counterions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler A G Uzwil, Switzerland under the trade designation "Buhler zirconia Z-WO sol". Zirconia nanoparticle can also be prepared such as described in U.S. patent application Ser. No. 11/027,426 filed Dec. 30, 2004 and U.S. Pat. No. 6,376,590.

The coating composition further comprises at least 0.05 and preferably at least 0.10 wt-% solids of one or more perfluoropolyether urethane additives. The total amount of perfluoropolyether urethane additives alone or in combination with other fluorinated additives can range up to 10 wt-% solids. In some embodiments, the amount of perfluoropolyether urethane additives ranges up to 1 wt-%, 2 wt-%, 3 wt-%, 4 wt-%, or 5 wt-% solids.

Typically, the perfluoropolyether urethane additive is made by first reacting a polyisocyanate with a perfluoropolyether compound containing an alcohol, thiol, or amine group. The perfluoropolyether urethane additive is then combined with a (e.g. non-fluorinated) isocyanate reactive multifunctional free-radically polymerizable (meth)acrylate crosslinker. Alternatively, perfluoropolyether urethane additives can be formed by other reaction sequences such as by first reacting the polyisocyanate with a polyisocyanate reactive crosslinker, followed by the addition of the perfluoropolyether compound. Further, all three components can be concurrently coreacted.

One or more polyisocyanate materials are employed in the preparation of the perfluoropolyether urethane. A variety of polyisocyanates may be utilized in the preparation of the perfluoropolyether urethane polymeric material. "Polyisocyanate" means any organic compound that has two or more reactive isocyanate (—NCO) groups in a single molecule such as diisocyanates, triisocyanates, tetraisocyanates, etc., and mixtures thereof. Cyclic and/or linear polyisocyanate molecules may usefully be employed. For improved weathering and diminished yellowing the polyisocyanate(s) of the isocyanate component is typically aliphatic.

Useful aliphatic polyisocyanates include, for example, bis (4-isocyanatocyclohexyl)methane ($H_{12}$ MDI) such as available from Bayer Corp., Pittsburgh, Pa. under the trade designation "Desmodur W"; isophorone diisocyanate (IPDI) such as commercially available from Hills America, Piscataway, N.J.; hexamethylene diisocyanate (HDI) such as commercially available from Aldrich Chemical Co., Milwaukee, Wis.; trimethyl hexamethylene diisocyanate such as commercially available from Degussa, Corp., Dusseldorf, Germany under the trade designation "Vestanate TMDI"; and m-tetramethylxylene diisocyanate (TMXDI) such as commercially available from Aldrich Chemical Co., Milwaukee, Wis. Although typically less preferred, aromatic isocyanates such as diphenylmethane diisocyanate (MDI) such as commercially available from Bayer Corp., Pittsburgh, Pa. under the trade designation "Mondur M"; toluene 2,4-diisocyanate (TDI) such as commercially available from Aldrich Chemical Co., Milwaukee, Wis., and 1,4-phenylene diisocyanate are also useful.

Preferred polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp. under the trade designation "Desmodur N-100", polyisocyanates based on HDI containing isocyanurate groups, such as that available from Bayer Corp. under trade designation "Desmodur N-3300", as well as polyisocyanates containing urethane groups, uretdione groups, carbodiimide groups, allophonate groups, and the like. These derivatives are preferred as they are polymeric, exhibit very low vapor pressures and are substantially free of isocyanate monomer.

Other polyisocyanates that may be used are available from Bayer Polymers LLC of Pittsburgh, Pa. under the trade designations "Desmodur TPLS2294", and "Desmodur N 3600"

One or more isocyanate reactive perfluoropolyether materials are employed in the preparation of the perfluoropolyether urethane. Various isocyanate reactive perfluoropolyethers materials can be utilized. The synthesis of various perfluoropolyether materials having (e.g. terminal) isocyanate reactive groups such as OH, SH or NHR wherein R is H of an alkyl group of 1 to 4 carbon atoms is known. For example, a methyl ester material (e.g. having an average molecular weight of 1,211 g/mol) for preparation of the alcohol can be prepared according to the method reported in U.S. Pat. No. 3,250,808 (Moore et al.), the disclosure of which is incorporated herein by reference, with purification by fractional distillation. Perfluoropolyether alcohol materials can be made by a procedure similar to that described in U.S. Publication No. 2004/0077775, filed May 24, 2002. Perfluoropolyether alcohol materials having an SH group can be made using this same process by use of aminoethane thiol rather than aminoethanol. Perfluoropolyether amine materials can be synthesized as described in US 2005/0250921.

The perfluoropolyether urethane material is preferably prepared from an isocyanate reactive HFPO— material. Unless otherwise noted, "HFPO—" refers to the end group $F(CF(CF_3)CF_2O)_aCF(CF_3)$— of the methyl ester $F(CF(CF_3)CF_2O)_aCF(CF_3)C(O)OCH_3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. For example, in one embodiment, "a" averages 6.2. The molecular weight of the HFPO— perfluoropolyether material varies depending on the number ("a") of repeat units from about 940 g/mole to about 1600 g/mole, with 1100 g/mole to 1400 g/mole typically being preferred.

Exemplary isocyanate reactive crosslinkers include for example 1,3-glycerol dimethacrylate available from Echo Resin Inc. of Versailles, Mo. and pentaerythritol triacrylate, available from Sartomer of Exton, Pa. under the trade designation "SR444C". Additional useful isocyanate reactive (meth)acrylate crosslinkers include hydantoin moiety-containing poly(meth)acrylates, for example, as described in U.S. Pat. No. 4,262,072 (Wendling et al.).

The reaction of the isocyanate compound, isocyanate reactive perfluoropolyether compound, and isocyanate reactive crosslinker generally results in a distribution of various reaction products. In addition to the reaction product of the polyisocyanate with both reactants, the reaction products of the polyisocyanate with one of the reactants are also present.

In one embodiment, the reaction product comprises a perfluoropolyether urethane additive of the formula:

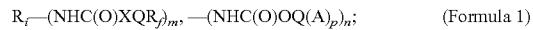  (Formula 1)

wherein $R_i$ is the residue of a multi-isocyanate;

X is O, S or NR, wherein R is H or an alkyl group having 1 to 4 carbon;

$R_f$ is a monovalent perfluoropolyether moiety comprising groups of the formula $F(R_{fc}O)_xC_dF_{2d}$—, wherein each $R_{fc}$ is independently a fluorinated alkylene group having from 1 to 6 carbon atoms, each x is an integer greater than or equal to 2, and wherein d is an integer from 1 to 6;

each Q is independently a connecting group having a valency of at least 2;

A is a (meth)acryl functional group —$XC(O)C(R_2)$=$CH_2$ wherein $R_2$ is an alkyl group of 1 to 4 carbon atoms or H or F;

m is at least 1; n is at least 1; p is 2 to 6; m+n is 2 to 10; wherein each group having subscripts m and n is attached to the $R_i$ unit.

Q in association with the Rf group is a straight chain, branched chain, or cycle-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

When X is O, Q is typically not methylene and thus contains two or more carbon atoms. In some embodiments, X is S or NR. In some embodiments, Q is an alkylene having at least two carbon atoms. In other embodiments, Q is a straight chain, branched chain, or cycle-containing connecting group selected from arylene, aralkylene, and alkarylene. In yet other embodiments, Q contains a heteroatom such as O, N, and S and/or a heteroatom containing functional groups such as carbonyl and sulfonyl. In other embodiments, Q is a branched or cycle-containing alkylene group that optionally contains heteroatoms selected from O, N, S and/or a heteroatom-containing functional group such as carbonyl and sulfonyl. In some embodiments Q contains a nitrogen containing group such an amide group such as —C(O)NHCH$_2$CH$_2$—, —C(O)NH(CH$_2$)$_6$—, and —C(O)NH(CH$_2$CH$_2$O)$_2$CH$_2$CH$_2$—.

If the mole fraction of isocyanate groups is given a value of 1.0, then the total mole fraction of m and n units used in making materials of Formula (1) is 1.0 or greater. The mole fractions of m:n ranges from 0.95:0.05 to 0.05:0.95. Preferably, the mole fractions of m:n are from 0.50:0.50 to 0.05:0.95. More preferably, the mole fractions of m:n are from 0.25:0.75 to 0.05:0.95 and most preferably, the mole fractions of m:n are from 0.25:0.75 to 0.10:0.95. In the instances the mole fractions of m:n total more than one, such as 0.15:0.90, the m unit is reacted onto the isocyanate first, and a slight excess (0.05 mole fraction) of the n units are used.

In a formulation, for instance, in which 0.15 mole fractions of m and 0.85 mole fraction of n units are introduced, a distribution of products is formed in which some fraction of products formed contain no m units. There will, however, be present in this product distribution, materials of Formula (1).

One representative reaction product formed by the reaction product of a biuret of HDI with one equivalent of HFPO oligomer amidol HFPO—C(O)NHCH$_2$CH$_2$OH wherein "a" averages 2 to 15, and further with two equivalents of pentaerythritol triacrylate is shown as follows

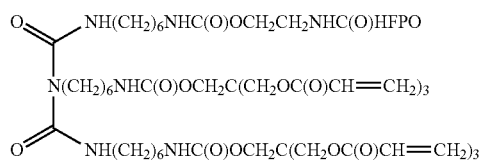

(Formula 2)

Various other reactants can be included in the preparation of the perfluoropolyether urethane such as described in WO2006/102383 and U.S. patent application Ser. No. 11/564,463 filed Nov. 29, 2006, entitled "Polymerizable Composition Comprising Perfluoropolyether Urethane Having Ethylene Oxide Repeat Units"; incorporated herein by reference.

The perfluoropolyether urethane polymeric material described herein may be employed alone or in combination with various other fluorinated compounds having at least one moiety selected from fluoropolyether, fluoroalkyl, and fluoroalkylene linked to at least one free-radically reactive group. When a second fluorinated compound is employed, it is typically preferred that such second fluorinated compound also comprises an HFPO— moiety. Various fluorinated materials that can be employed in combination with the perfluoropolyether urethane polymeric material described are also described in WO2006/102383.

The coating composition described herein preferably comprises one or more silicone (meth)acrylate additives. Silicone (meth)acrylate additives generally comprise a polydimethylsiloxane (PDMS) backbone and an alkoxy side chain with a terminal (meth)acrylate group. Such silicone (meth)acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction, particularly in the hardcoat composition set forth in the examples.

Based on NMR analysis "TEGO Rad 2100" and "TEGO Rad 2500" are believed to have the following chemical structure:

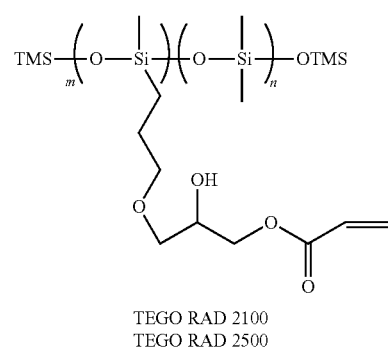

TEGO RAD 2100
TEGO RAD 2500 wherein n ranges from 10 to 20 and m ranges from 0.5 to 5.

In some embodiments, n ranges from 14 to 16 and n ranges from 0.9 to 3. The molecular weight typically ranges from about 1000 g/mole to 2500 g/mole.

Based on Thermal Gravimetric Analysis (according to the test method described in the example), silicone (meth)acrylates having a residue content of less than 12 wt-% provided the lowest haze values according to the Cellulose Surface Attraction Test.

The silicone (meth)acrylate additive is typically added to the hardcoat composition at a concentration at least equal to that of the perfluoropolyether urethane additive. The concentration may range from at least about 0.10, 0.20, 0.30, 0.40, or 0.50 wt-% solids of the hardcoat composition to as much as 5, wt-%, 10 wt-% or 20 wt-% solids. In some embodiments, the concentration of the silicone (meth)acrylate additive range from about 5× to 10× the concentration of the perfluoropolyether urethane additive or from 1 to 3 wt-% solids of the hardcoat composition.

The polymerizable perfluoropolyether urethane(s) and silicone (meth)acrylate additive(s) is typically dispersed in an inorganic particle containing hardcoat composition in combination with an organic (non-fluorinated) solvent, applied to a (e.g. light transmissive) substrate and photocured to form the easy to clean, stain and ink repellent light transmissible surface layer.

Alternatively, an inorganic particle free hardcoat composition comprising the perfluoropolyether urethane(s), silicone (meth)acrylate additive(s), and a major amount (e.g. non-fluorinated) multifunctional crosslinker may be employed alone for uses where durability is not required.

In yet another embodiment, an inorganic particle free surface layer may be provided in combination with an inorganic particle containing hardcoat layer disposed between the substrate and the surface layer, forming a durable two-layer hardcoat.

For one-layer hardcoat embodiments, the total of all (per) fluorinated compounds, (e.g. the perfluoropolyether urethane(s) alone or in combination with other fluorinated compounds) ranges from 0.01% to 10%, and more preferably from 0.1% to 1%, of the total solids of the hardcoat composition. For two-layer hardcoat embodiments the amount of perfluoropolyether urethane(s) in the coating compositions ranges from 0.01 to 50 wt-% solids, and more preferably from 1 to 25 wt-% solids.

To facilitate curing, polymerizable compositions described herein may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.). Useful free-radical thermal initiators include, for example, azo, peroxide, persulfate, and redox initiators, and combinations thereof. Useful free-radical photoinitiators include, for example, those known as useful in the UV cure of acrylate polymers such as described in WO2006/102383.

The inorganic nanoparticles of the hardcoat are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethyl carbamate, N-(3-triethoxysilylpropyl)methoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety known ways, such as described in U.S. patent application Ser. No. 11/027,426 filed Dec. 30, 2004; U.S. Pat. No. 6,376,590.

A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component (e.g. having an acrylate, methacrylate, or vinyl group) of the polymerizable resin and a second amphiphilic modifying agent, such as a polyether silane, that may act as a dispersant. The second modifying agent is preferably a polyalkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The attraction of the perfluoropolyurethane-containing hardcoat surface to lint can be further reduced by including an antistatic agent. For example, an antistatic coating can be applied to the (e.g. optionally primed) substrate prior to coating the hardcoat. The thickness of the antistatic layer is typically at least 20 nm and generally no greater than 400 nm, 300 nm, or to 200 nm.

The antistatic coating may comprise at least one conductive polymer as an antistatic agent. Various conductive polymers are known. Examples of useful conductive polymers include polyaniline and derivatives thereof, polypyrrole, and polythiophene and its derivatives. One particularly suitable polymer is poly(ethylenedioxythiophene) (PEDOT) such as poly(ethylenedioxythiophene) doped with poly(styrenesulfonic acid)(PEDOT:PSS) commercially available from H. C. Starck, Newton, Mass. under the trade designation "BAYTRON P". This conductive polymer can be added at low concentrations to sulfopolyester dispersions to provide antistatic compositions that provided good antistatic performance in combination with good adhesion particularly to polyester and cellulose acetate substrates.

In other embodiments, the antistatic coating or hardcoat composition may comprise conductive metal-containing particles, such as metals or semiconductive metal oxides. Such particles may also be described as nanoparticles having a particle size or associated particle size of greater than 1 nm and less than 200 nm. Various granular, nominally spherical, fine particles of crystalline semiconductive metal oxides are known. Such conductive particles are generally binary metal oxides doped with appropriate donor heteroatoms or containing oxygen deficiencies. Suitable conductive binary metal oxides may comprise: zinc oxide, titania, tin oxide, alumina, indium oxide, silica, magnesia, zirconia, barium oxide, molybdenum trioxide, tungsten trioxide, and vanadium pentoxide. Preferred doped conductive metal oxide granular particles include Sb-doped tin oxide, Al-doped zinc oxide, In-doped zinc oxide, and Sb-doped zinc oxide.

Various antistatic particles are commercially available as water-based and solvent-based dispersions. Antimony tin oxide (ATO) nanoparticle dispersions that can be used include a dispersion available from Air Products under the trade designation "Nano ATO S44A" (25 wt-% solids, water), 30 nm and 100 nm (20 wt% solids, water) dispersions available from Advanced Nano Products Co. Ltd. (ANP), 30 nm and 100 nm ATO IPA sols (30 wt-%) also available from ANP, a dispersion available from Keeling & Walker Ltd under the trade designation "CPMIOC" (19.1 wt-% solids), and a dispersion commercially available from Ishihara Sangyo Kaisha, Ltd under the trade designation "SN-100 D" (20 wt% solids). Further, an antimony zinc oxide (AZO) IPA sol (20 nm, 20.8 wt-% solids) is available from Nissan Chemical America, Houston Tex. under the trade designations "CELNAX CX-Z210IP", "CELNAX CX-Z300H" (in water), "CELNAX CX-Z401M" (in methanol), and "CELNAX CX-Z653M-F" (in methanol).

For nanoparticle antistats, the antistatic agent is present in an amount of at least 20 wt%. For conducting inorganic oxide nanoparticles, levels can be up to 80 wt % solids for refractive index modification. When a conductive polymer antistat is employed, it is generally preferred to employ as little as possible due to the strong absorption of the conductive polymer in the visible region. Accordingly, the concentration is generally no greater than 20 wt-% solid, and preferably less than 15 wt-%. In some embodiments the amount of conductive polymer ranges from 2 wt-% to 5 wt-% solids of the dried antistatic layer.

The perfluoropolyether urethane and silicone (meth)acrylate additive in combination with the hardcoat composition can be dispersed in a solvent to form a dilute coating composition. The amount of solids in the coating composition is typically at least 20 wt-% and usually no greater than about 50 wt-%.

The method of forming the hardcoated article or hardcoat protective film includes providing a (e.g. light transmissible) substrate layer and providing the composition on the (optionally primed) substrate layer. The coating composition is dried to remove the solvent and then cured for example by exposure to ultraviolet radiation (e.g. using an H-bulb or other lamp) at a desired wavelength, preferably in an inert atmosphere (less than 50 parts per million oxygen) or an electron beam. Alternatively, a transferable hardcoat film may be formed coating the composition to a release liner, at least partially cured, and subsequently transferring from the release layer to the substrate using a thermal transfer or photoradiation application technique.

The composition can be applied as a single or multiple layers directly to an article or film substrate using conventional film application techniques. Although it is usually convenient for the film substrate to be in the form of a roll of continuous web, the coatings may be applied to individual sheets.

Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

The hardcoat coating composition can be provided on a gloss or matte surface. For example, the surface can be roughened or textured to provide a matte surface. This can be accomplished in a variety of ways as known in the art including embossing the low refractive index surface with a suitable tool that has been bead-blasted or otherwise roughened, as well as by curing the composition against a suitable roughened master as described in U.S. Pat. No. 5,175,030 (Lu et al.) and U.S. Pat. No. 5,183,597 (Lu).

Matte low and high refractive index coatings can also be prepared by adding a suitably sized particle filler such as silica sand or glass beads to the composition. Such matte particles are typically substantially larger than the surface modified low refractive index particles. For example the average particle size typically ranges from about 1 to 10 microns. The concentration of such matte particles may range from at least 2 wt-% to about 10 wt-% or greater. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (i.e. haze).

In yet another aspect, the hardcoat coating composition can be provided on a matte film substrate. Exemplary matte films are commercially available from U.S.A. Kimoto Tech, Cedartown, Ga. under the trade designation "N4D2A".

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like. Typically the substrate will be chosen based in part on the desired optical and mechanical properties for the intended use. Such mechanical properties typically will include flexibility, dimensional stability and impact resistance. The substrate thickness typically also will depend on the intended use. For most applications, a substrate thickness of less than about 0.5 mm is preferred, and is more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

The hardcoat or protective film prepared from such hardcoat is suitable for use with various articles such as optical displays and display panels.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches, The exposed surface of such display panels may be referred to as a "lens." The invention is particularly useful for displays having a viewing surface that is susceptible to being touched or contacted by ink pens, markers and other marking devices, wiping cloths, paper items and the like. The protective coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

Various permanent and removable grade adhesive compositions may be coated on the opposite side (i.e. to the hardcoat) of the (e.g. protective film substrate) so the article can be easily mounted to a display surface. Suitable adhesive compositions include (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

GLOSSARY

For the following defined terms, these definitions shall be applied, unless a different definition is given in the claims or elsewhere in the specification.

"Free-radically polymerizable" refers to the ability of monomers, oligomers, polymers or the like to participate in crosslinking reactions upon exposure to a suitable source of free radicals.

"(Meth)acryl" refers to functional groups including acrylates, methacrylates, acrylamides, methacrylamides, alpha-fluoroacrylates, thioacrylates and thio-methacrylates. A preferred (meth)acryl group is acrylate.

"Monovalent perfluoropolyether moiety" refers to a perfluoropolyether chain having one end terminated by a perfluoroalkyl group.

Unless otherwise noted, "HFPO—" refers to the end group $F(CF(CF_3)CF_2O)aCF(CF_3)$— of the methyl ester $F(CF(CF_3)CF_2O)aCF(CF_3)C(O)OCH3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. In one embodiment a averages 6.2. This methyl ester has an average molecular weight of 1,211 g/mol, and can be prepared according to the method reported in U.S. Pat. No. 3,250,808 (Moore et al.), the disclosure of which is incorporated herein by reference, with purification by fractional distillation.

The recitation of numerical ranges by endpoints includes all numbers subsumed within the range (e.g. the range 1 to 10 includes 1, 1.5, 3.33, and 10).

Objects and advantages of this invention are further illustrated by the following examples, but the particular materials and amounts thereof recited in these examples, as well as other conditions and details, should not be construed to unduly limit this invention.

Materials $HFPO—C(O)N(H)CH_2CH_2OH$ of molecular weight 1344 was made by a procedure similar to that described in U.S. Publication No. 2004-0077775, entitled "Fluorochemical Composition Comprising a Fluorinated Polymer and Treatment of a Fibrous Substrate Therewith," filed on May 24, 2002, for Synthesis of HFPO-oligomer alcohols with the exception that HFPO methyl ester $F(CF(CF_3)CF_2O)aCF(CF_3)C(O)CH_3$ with a=6.2 was replaced with $F(CF(CF_3)CF_2O)aCF(CF_3)C(O)OCH_3$ wherein a=6.67. The methyl ester material for preparation of the alcohol can be prepared according to the method reported in U.S. Pat. No. 3,250,808 (Moore et al.), the disclosure of which is incorporated herein by reference, with purification by fractional distillation.

Polyisocyanate was obtained from Bayer Polymers LLC, of Pittsburgh, Pa. under the trade designation "Desmodur™ N100". ("Des N100")

2,6-di-t-butyl-4-methylphenol (BHT), dodecanol, octadecanol, H2N(CH2)6OH, and dibutyltin dilaurate (DBTDL) are available from Sigma Aldrich of Milwaukee, Wis.

Pentaerythritol triacrylate ("PET3A"), under the trade designation "SR444C", was obtained from Sartomer Company of Exton, Pa.

Dibutyltin dilaurate was obtained from (DBTDL) (Sigma-Aldrich)

Methyl ethyl ketone (MEK) was obtained from (EMD Chemicals, Gibbstown, N.J.)

Preparation of DES N100/0.95 PET3A/0.10 HFPO—C(O)NHCH$_2$CH$_2$OH (HFPO Urethane 1)

A 500 mL roundbottom equipped with magnetic stirbar was charged with 25.0 g (0.131 eq, 191 EW) DES N100, and 128.43 g methyl ethyl ketone. The reaction was swirled to dissolve all the reactants, the flask was placed in an oil bath at 55° C., and fitted with a adapter under dry air. Next, 0.10 g of a 10% by weight solids solution in MEK of dibutyltin dilaurate was added to the reaction. Via addition funnel, 17.59 g (0.0131 eq, 1344 EW) HFPO—C(O)N(H)CH$_2$CH$_2$OH was added to the reaction over about 20 min. The funnel was rinsed with ~15 g of MEK. Two hours after the addition was complete, 0.52 g of BHT was added directly into the reaction, followed by dispensing 61.46 g (0.1243 eq, 494.3 EW) of Sartomer SR444C from a beaker. The beaker was then rinsed with ~30 g of MEK. The reaction was monitored by FTIR and showed no peak due to an —NCO functional group at ~2265 cm$^{-1}$ after 20 h of additional reaction. The reaction flask and contents were weighed, and the reaction was then adjusted to 30% solids by addition of 2.23 g of MEK to provide a clear light yellow solution.

Thermal Gravimetric Analysis

The silicone (meth)acrylate additive employed in the examples were analyzed by holding each sample for 30 min at 110 deg C. in nitrogen and then heating at a rate of 20 deg C./minute to a temperature of 785 deg C. in air. The total weight loss from 125 deg C. to 785 deg C. is reported as follows:

| | |
|---|---|
| TEGO Rad 2100 | 89.79% |
| TEGO Rad 2250 | 92.92 |
| TEGO Rad 2300 | 86.12 |
| TEGO Rad 2500 | 86.76 |
| TEGO Rad 2700 | 84.43 |

Coating Composition Preparation—To 62.5 grams of a ceramer hardcoat composition (as described in column 10, line 25-39 and Example 1 of U.S. Pat. No. 5,677,050 to Bilkadi, et al.) was added 30 grams of ethyl acetate and 7.5 grams of methoxy propanol. Various amounts of the HFPO Urethane 1 and free-radically polymerizable silicone (meth) acrylates (commercially available from Degussa under the trade designations "Tego Rad 2100", "Tego Rad 2250", "Tego Rad 2300", "Tego Rad 2500", and "Tego Rad 2700") were combined with this diluted ceramer hardcoat composition as set forth in Table 2. The final solution was coated on 4 mil primed PET (commercially available from Dupont under the trade designation "Melinex 618") using a #12 wire wound rod and dried at 70° C. for 2 minutes. The dried coating having a thickness of about 4 microns was then cured with a Light Hammer 6 UV source using a Fusion H bulb (Fusion UV Systems, Inc., Gaithersburg, Md.), at 100% power, under nitrogen at 30 feet/min.

TABLE 2

Additives in Hardcoat Coating Composition

| Sample No. | Wt-% Solids HFPO Urethane 1 | Silicone Acrylate - Wt-% Solids |
|---|---|---|
| Comp 1 | 0.15% | 0 |
| Comp 2 | 0 | Tego Rad 2250 - 1% |
| 3 | 0.15% | Tego Rad 2250 - 1% |
| Comp 4 | 0.20 | 0 |
| 5 | 0.20 | Tego Rad 2100 - 1 |
| 6 | 0.20 | Tego Rad 2250 - 1 |
| 7 | 0.20 | Tego Rad 2300 - 1 |
| 8 | 0.20 | Tego Rad 2500 - 1 |
| 9 | 0.20 | Tego Rad 2700 - 1 |
| 10* | 0.20 | Tego Rad 2100 - 1.5 |
| 11 | 0.20 | Tego Rad 2100 - 1.5 |

*The hardcoat was coated onto an antistatic layer that was formed on the PET as follows: A coating solution was prepared by combining 970.8 g deionized water, 19.23 g of PEDOT/PSS (Baytron ® P from H.C. Starck, 1.3 wt % solids), 7.5 g of surfactant (Tomadol ® 25-9 from Tomah Products, 10 wt % in deionized water), and 2.5 g N-methylpyrrolidinone. This deep blue solution (0.025 wt % PEDOT/PSS) was coated on primed 5 mil PET film (prepared according to Example 29 of U.S. Pat. No. 6,893,731 B2) using a 4-in die coater. The web speed was 35 ft/min and the solution flow rate was 12.4 g/min. Hot zone temperatures were 140 F. in the gap dryer and 140, 160, and 180 F. in the ovens.

Test Methods

Contact Angle—Film samples were cut and mounted on glass slides using 3M transfer adhesive before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table 2. Drop volumes were 5 µL for static measurements and 1-3 µL for advancing and receding. For hexadecane, only advancing and receding contact angles are reported because static and advancing values were found to be nearly equal.

PGX Contact Angle—The static contact angle with water of Examples 4-12 was measured using a PGX goniometer from Fibro System AB, Sweden. A 4 microliter DI water drop was used and the PGX instrument automatically recorded the static contact angle.

Cellulose Surface Attraction Test—After the coated PET film was prepared it was allowed to condition for 24 hours at ambient temperature and 50%+/−10% relative humidity to allow it to be charged. After conditioning each coated PET sample was cleaned with a Simco "Viper" static neutralizing gun to remove any dust. Then 0.35 grams of alpha-cellulose (C-8002) from Sigma Chemical Company (St. Louis, Mo.) was applied to the top of the coating in a 7 cm diameter area. The coated film was tilted back and forth several times to allow the cellulose to evenly coat the 7 cm. diameter test area. The excess cellulose was then shaken off and the haze of the coating plus cellulose was measured according to ASTM D1003.

TABLE 3

Test Results

| Sample | Water Static Contact Angle | Hexadecane-Advancing Contact Angle | Hexadecane-Receeding Contact Angle | Cellulose Surface Attraction Test |
|---|---|---|---|---|
| Comp 1 | 95.3 | 57.0 | 49.7 | 31% |
| Comp 2 | 63.7 | 34.9 | 30.9 | 1.5 |
| 3 | 98.2 | 52.1 | 40.6 | 9 |
| Comp 4 | 92 | | | 31 |

TABLE 3-continued

Test Results

| Sample | Water Static Contact Angle | Hexadecane-Advancing Contact Angle | Hexadecane-Receeding Contact Angle | Cellulose Surface Attraction Test |
|---|---|---|---|---|
| 5 | 96.6 | | | 8 |
| 6 | 93.5 | | | 16 |
| 7 | 94.6 | | | 18 |
| 8 | 95.8 | | | 18.5 |
| 9 | 97.4 | | | 24 |
| 10 | 98 | | | 0.5% |
| 11 | 96 | | | 1.0% |

Comparing Examples 1-3, it is clear that the silicone polyether acrylate provides quite low static water and hexadecane contact angle compared to the samples containing the HFPO urethane derivative. However, Example 1 with only the HFPO urethane derivative attracts high amounts of lint (high value using cellulose test). Combining the silicone (meth)acrylate and the HFPO urethane provides high contact angles (easy clean surface) and good lint repellency (low haze in the cellulose test).

What is claimed is:

1. An article comprising a substrate having a surface layer comprising the reaction product of a mixture comprising
   i) at least 75 wt-% of a hydrocarbon-based hardcoat composition;
   ii) 0.05 wt-% to 5 wt-% of at least one perfluoropolyether urethane additive having a at least one free-radically reactive group; and
   iii) 0.5 wt-% to 20 wt-% of one or more free-radically polymerizable silicone (meth)acrylate additives;
   wherein the surface layer exhibits less than 20% haze according to the Cellulose Surface Attraction Test and an advancing contact angle with hexadecane of at least 50°.

2. The article of claim 1 wherein the surface layer exhibits less than 10% haze.

3. The article of claim 1 wherein the surface layer exhibits a static contact angle with water of at least 90°.

4. The article of claim 1 wherein the mixture further comprises surface modified inorganic oxide nanoparticles.

5. The article of claim 1 wherein the substrate is a light-transmissive substrate.

6. The article of claim 1 wherein the surface layer has a thickness ranging from 0.5 microns to 25 microns.

7. The article of claim 1 wherein the article is an optical display.

8. The article of claim 1 wherein the article is a protective film.

9. The article of claim 1 wherein article further comprises an antistatic coating between the substrate and the surface layer.

10. The article of claim 1, wherein the hydrocarbon-based hardcoat composition further comprising a plurality of surface modified inorganic nanoparticles.

11. The article of claim 1, wherein said hydrocarbon-based hardcoat composition comprises a non-fluorinated (meth)acrylate crosslinker having at least three (meth)acrylate groups.

12. The article of claim 1 wherein ii) comprises a terminal group having at least two (meth)acryl groups.

13. The article of claim 1 wherein the perfluoropolyether urethane additive comprises reaction products of the formula:
$R_i\text{—(NHC(O)XQR}_f)_m, \text{—(NHC(O)OQ(A)}_p)_n;$
wherein
   $R_1$ is the residue of a multi-isocyanate;
   X is O, S or NR, wherein R is H or an alkyl group having 1 to 4 carbon;
   $R_f$ is a monovalent perfluoropolyether moiety comprising groups of the formula $F(R_{fc}O)_xC_dF_{2d}\text{—}$, wherein each $R_{fc}$ is independently a fluorinated alkylene group having from 1 to 6 carbon atoms, each x is an integer greater than or equal to 2, and wherein d is an integer from 1 to 6;
   each Q is independently a connecting group having a valency of at least 2;
   A is a (meth)acryl functional group $\text{—XC(O)C(R}_2)\text{=CH}_2$ wherein $R_2$ is an alkyl group of 1 to 4 carbon atoms or H or F;
   m is at least 1;
   n is at least 1;
   p is 2 to 6;
   m+n is 2 to 10; and
   wherein each group having subscripts m and n is attached to the $R_i$ unit.

14. The article of claim 13 wherein said perfluoropolyether urethane additive comprises:

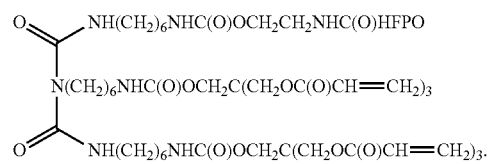

15. The article of claim 1 wherein the silicone (meth) acrylate additive is present at a concentration ranging from 5× to 10× the concentration of the perfluoropolyether urethane additive.

16. The article of claim 1 wherein the silicone (meth) acrylate additive comprises a polydimethylsiloxane backbone and an alkoxy side chain having a terminal (meth) acrylate group.

17. The article of claim 1 wherein the silicone (meth) acrylate has a residue content of less 12 wt-% according to thermal gravimetric analysis.

18. The article of claim 1 wherein the silicone (meth) acrylate additive is present at a concentration at least equal or greater to that of the perfluoropolyether urethane additive.

19. The article of claim 1 wherein the one or more free-radically polymerizable silicone (meth)acrylate additives are present in an amount no greater than 10 wt%.

20. The article of claim 1 wherein the one or more free-radically polymerizable silicone (meth)acrylate additives are present in an amount no greater than 5 wt%.

* * * * *